United States Patent
Roberts (10) Patent No.: US 7,798,360 B2
(45) Date of Patent: Sep. 21, 2010

(54) REUSABLE PENETRATABLE SEAL

(76) Inventor: Tyrone J. Roberts, 12 N. Ridgeview Rd., Stuart, FL (US) 34996

( * ) Notice: Subject to any disclaimer, the term of this patent is extended or adjusted under 35 U.S.C. 154(b) by 1093 days.

(21) Appl. No.: 11/491,809

(22) Filed: Jul. 24, 2006

(65) Prior Publication Data

US 2008/0017652 A1 Jan. 24, 2008

(51) Int. Cl.
*A47G 19/22* (2006.01)
*B65D 53/00* (2006.01)
*B65D 51/24* (2006.01)

(52) U.S. Cl. .................. 220/710; 220/203.18; 220/705; 220/709; 220/713

(58) Field of Classification Search ................. 220/710, 220/203.17, 203.18, 705, 709, 713, 714
See application file for complete search history.

(56) References Cited

U.S. PATENT DOCUMENTS

| | | | |
|---|---|---|---|
| 2,125,609 A | 8/1938 | Goodwin | |
| 3,164,280 A | 1/1965 | Ford | |
| 3,281,024 A | 10/1966 | Henchert | |
| 3,438,527 A * | 4/1969 | Gamblin, Jr. | 215/388 |
| 3,556,122 A * | 1/1971 | Laerdal | 137/102 |
| 4,165,816 A * | 8/1979 | Tupper | 220/203.14 |
| 4,441,640 A | 4/1984 | Lottick | |
| 4,685,577 A * | 8/1987 | Chen | 215/11.5 |
| 4,836,404 A * | 6/1989 | Coy | 220/714 |
| 5,040,719 A | 8/1991 | Ballway | |
| 5,085,335 A * | 2/1992 | Carbaugh | 220/709 |
| 5,150,811 A | 9/1992 | Kelston | |
| 5,397,023 A | 3/1995 | Toczek et al. | |
| 5,425,471 A * | 6/1995 | Wendt | 220/705 |
| 5,431,290 A * | 7/1995 | Vinciguerra | 215/11.5 |
| 5,705,210 A * | 1/1998 | Sillince et al. | 426/112 |
| 5,979,697 A * | 11/1999 | Kim | 220/713 |
| 6,032,825 A * | 3/2000 | Guthrie | 220/731 |
| 6,550,493 B2 * | 4/2003 | Williamson et al. | 137/510 |
| 7,178,685 B2 * | 2/2007 | Hidalgo et al. | 220/229 |
| 7,228,789 B1 * | 6/2007 | Mondszein et al. | 99/277 |
| 2003/0168455 A1 | 9/2003 | Zettle et al. | |
| 2003/0213803 A1 | 11/2003 | Chasteen et al. | |
| 2004/0245250 A1 * | 12/2004 | Hidalgo et al. | 220/229 |
| 2005/0011902 A1 | 1/2005 | Naesje | |
| 2005/0029270 A1 * | 2/2005 | Marshall | 220/705 |
| 2005/0067417 A1 * | 3/2005 | Sanders et al. | 220/324 |
| 2005/0150894 A1 * | 7/2005 | Stribling et al. | 220/705 |
| 2006/0151499 A1 * | 7/2006 | Lieberman et al. | 220/203.11 |

* cited by examiner

*Primary Examiner*—Anthony Stashick
*Assistant Examiner*—Niki M Eloshway
(74) *Attorney, Agent, or Firm*—Michael K. Dixon; Akerman Senterfitt (57) ABSTRACT

A seal system usable to seal containers and other fluid components to allow fluid flow through the seal system in a first direction yet prevent fluid flow through the seal system in an opposite direction. The seal system is particularly useful for facilitating insertion of a tube, such as a straw, into a container to withdraw fluids yet prevent fluids from leaking from a container once the straw has been withdrawn. The seal system may be formed from a flange having an opening and attached to the opening of the container, and a tubular body extending from the flange into the container. The tubular body may be formed from a transition section attached to the flange and extending generally away from the flange, and a collapsed seal section attached to the transition section and extending from the transition section away from the flange.

26 Claims, 7 Drawing Sheets

REUSABLE PENETRATABLE SEAL

FIELD OF THE INVENTION

This invention relates to sealing systems for fluids contained in or flowing through fluid components, and more particularly, to seals enabling fluids to flow through the seal in a first direction while preventing fluid flow in an opposite direction.

BACKGROUND OF THE INVENTION

Many containers include removable caps and other devices that enable fluids to be filled and removed from the containers while enabling the containers to be resealed. For instance, a conventional screw cap has been used to seal a container. The screw cap may be removed and replaced numerous times, thereby enabling the container to be sealed and unsealed numerous times. While screw caps have been effective, use of the screw caps often can be time consuming, which often leads to a person not using the cap or the cap being lost.

Another such device is a plus sign shaped cut in a plastic lid for a fountain beverage cup through which a straw is typically inserted. The cut enables a straw to be inserted into the beverage cup so that a user may suck the beverage through the straw. The lid limits spillage of the beverage, however, the beverage may leak from the gaps created between the lid and the straw at the cut. The cut and lit are better suited to prevent fluids from splashing out of the cup than for leak prevention should the cup turn over. Many consumers have included the use of straws in their daily routine to such an extent that the consumers often desire to use straws as often as possible. However, many beverage bottles are not adapted for use with straws with spillage protection. Thus, a need exists for a seal adaptable for many different containers that enables a straw to be inserted through the seal, yet seals the container once the straw has been withdrawn.

SUMMARY OF THE INVENTION

This invention is directed to a seal system usable to seal containers and other fluid components to allow fluid flow through the seal system in a first direction yet prevent fluid flow through the seal system in a second direction opposite to the first direction. The seal system is particularly useful in allowing a tube, such as a straw, to be inserted into a container to withdraw fluids yet prevent fluids from leaking from a container once the straw has been withdrawn. The seal system is thus useful in many applications.

The seal system may include a flange that is adapted to be attached to an opening of the fluid component, which may be, but is not limited to being, beverage bottles, such as water bottles, soda bottles, sports drink bottles, and other fluid containers, a water pipe, a drain, or other appropriate devices. The flange may include an opening through which fluids may flow. The seal system may also include a tubular body extending from the flange. The tubular body may include a transition section attached to the flange and extending generally away from the flange and may include a collapsed seal section attached to the transition section and extending from the transition section away from the flange. The collapsed seal section may be configured such that a straw or other appropriate object may be inserted through the collapsed seal section to enable fluids to be withdrawn through the straw yet substantially, if not completely, prevent fluids from flowing through the collapsed seal section outside of the straw. In addition, removing the straw from the transition section collapsed seal section enables the collapsed seal section to return to a relaxed condition in which a first side of the collapsed seal section is in contact with a second side of the collapsed seal section that is opposite to the first side such that fluids are prevented from flowing through the collapsed seal section from a first end to the transition section. In at least one embodiment, the resealable characteristic of the seal system is due to the ability of the collapsed seal section to return to a relaxed position in which the first and second sides of the collapsed seal section are in contact with each other. The tubular body, and in particular, the collapsed seal section may be formed from a flexible, sheet material or other appropriate material to enable this function.

The seal system may be used in many different applications. For instance, the seal system may be attached to a conventional water bottle. The flange may be attached to the opening such that the tubular body resides in the water bottle. The tubular body may be positioned in the water bottle by a user, or may be positioned in the water bottle during the bottling process or manufacturing process of the bottle or bottle cap. In particular, a user may insert the tubular body into the water bottle and attach the flange to the water bottle with an adhesive. In another embodiment, the tubular body may be attached to a conventional paper carton. The flange may be attached to an inner surface of the convention paper carton. A hole may be positioned in the carton under the closed top. The hole may be accessed by separating one sealed fold of the carton or by directly inserting a straw into the hole. A removable lid may releasably cover the hole for safety. The removable lid may be a thin plastic film, foil, or other appropriate material.

In at least one example, the seal system may be used to provide a seal for a fluid container, such as a handheld beverage bottle. The flange may be attached to an opening in the fluid component. The transition section and the collapsible seal section may extend into the fluid container. A tube, such as a straw, may be inserted into the opening in the flange and into the fluid contained in the fluid container. The straw may be inserted into the flange, through the transition section and into the collapsed seal section. As the straw passes into the collapsed seal section, the first and second sides of the collapsed seal section separate enough to allow the straw to be inserted through the collapsed seal section. A small gap may be created between the first and second sides of the collapsible seal section and the straw. Fluids may be withdrawn through the straw by a person sucking on the straw, with a mechanical pump, or otherwise. Air may pass through the small gap created between the first and second sides of the collapsible seal section and the straw to prevent formation of a vacuum in the fluid container. Thus, fluids may be easily withdrawn from the fluid component through the straw without the hindrance of a vacuum reducing the flow.

An advantage of this invention is that the seal enables a straw to be inserted through the seal enabling fluids to be withdrawn, and the straw to be withdrawn without the container leaking. Thus, a person may drink from a container and withdraw the straw before the drink is finished without the fluid leaking from the container.

Another advantage of this invention is that an opening of a fluid component may be sealed with up to three seals, including, the collapsible seal section, a removable lid attached to the flange, such as a plastic film or foil, and a plug attached to a removable cap of the fluid component.

Yet another advantage of this invention is that the seal may be that the seal enables a user to suck fluids through a straw, remove the straw, which seals the container and prevents the fluids, such a carbonated beverages, from going flat and losing its carbonation.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 1-20, this invention is directed to a seal system 10 usable to seal containers 12 and other fluid components to allow fluid flow through the seal system 10 in a first direction yet prevent fluid flow through the seal system 10 in a second direction opposite to the first direction. The seal system 10 may include a flange 14 that is adapted to be attached to an opening 16 of the fluid component 12. The flange 14 may include an opening 18 through which fluids may flow. The seal system 10 may also include a tubular body 20 extending from the flange 14. The tubular body 20 may include a transition section 22 attached to the flange 14 and extending generally away from the flange 14 and may include a collapsed seal section 24 attached to the transition section 22 and extending from the transition section 22 away from the flange 14.

The collapsed seal section 24 may be configured such that a straw 26 or other appropriate object may be inserted through the collapsed seal section 24 to enable fluids to be withdrawn through the straw 26 yet substantially prevent fluids from flowing through the collapsed seal section 24 outside of the straw 26. In addition, removing the straw 26 from the transition section collapsed seal section 24 enables the collapsed seal section 24 to return to a relaxed condition in which a first side 28 of the collapsed seal section 24 is in contact with a second side 30 of the collapsed seal section 24 that is opposite to the first side 28 whereby fluids are prevented from flowing through the collapsed seal section 24 from a first end 32 to the transition section 22.

Figure 1:
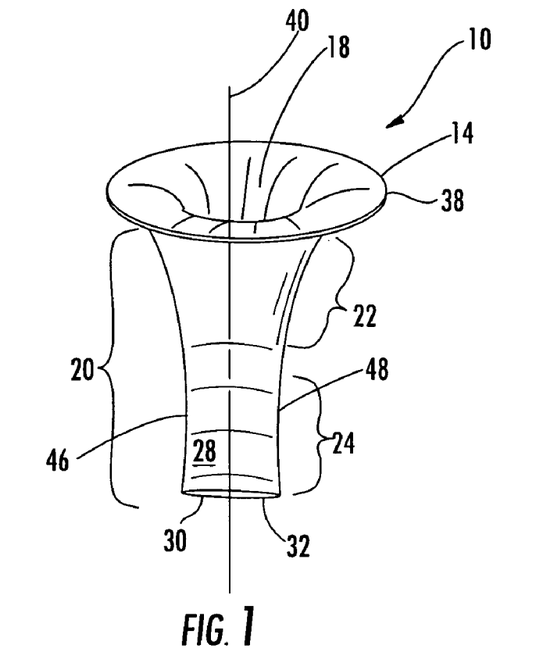
FIG. 1 is a perspective view of a seal having aspects of the seal system.

In at least one embodiment, the resealable characteristic of the seal system 10 is due to the ability of the collapsed seal section 24 to return to a relaxed position in which the first and second sides 28, 30 of the collapsed seal section 24 are in contact with each other between first and second edges 46, 48. The tubular body 20, and in particular, the collapsed seal section 24 may be formed from a flexible, sheet material or other appropriate material to enable this function and may have any appropriate length. As shown in FIG. 1, the collapsed seal section 24 may be generally curved about a longitudinal axis 40 to facilitate sealing the first and second sides 28, 30.

As shown in FIG. 1, the seal system 10 may be formed from a tubular body 20 extending from a flange 14. The flange 14 may be configured to be attached to a fluid component 12 proximate to the opening 16. The fluid component 12 may be, but is not limited to being, beverage bottles, such as water bottles, soda bottles, sports drink bottles, and other fluid containers, a water pipe, a drain, or other appropriate devices. The flange 14 may be sized to be attachable to the walls 34 forming the opening 16 in the fluid component 12. The size, such as the diameter and thickness, of the flange 14 may vary depending on the application. In at least one embodiment, the flange 14 may be larger than the opening 16 such that the flange 14 may be releasably or permanently attached to walls 34 forming the opening 16. In another embodiment, the flange 14 may be attached to inner surfaces 36 of the walls 34 forming the opening 16. The flange 14 may be attached with an adhesive, by melting the flange 14 to the walls 34, such as welding, or other appropriate methods.

Figure 3:
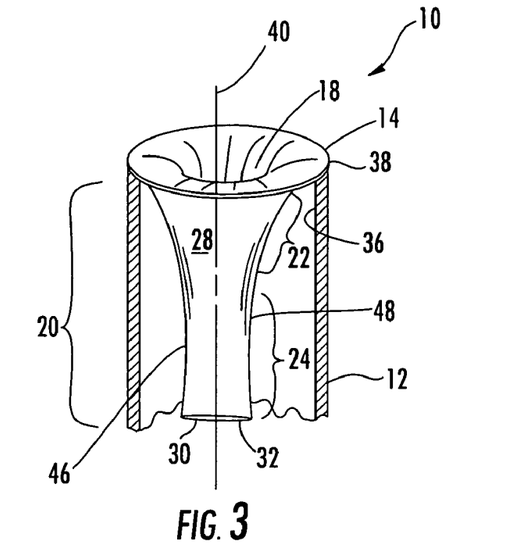
FIG. 3 is a perspective view of a seal positioned within a bottle neck that is partially cutaway to expose the seal.
Figure 4:
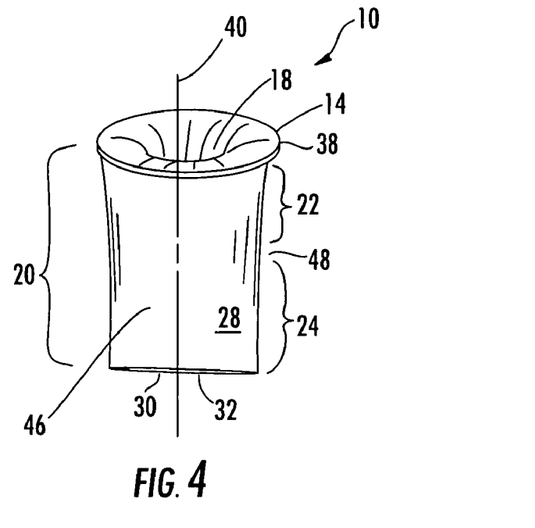
FIG. 4 is a perspective side view of a seal of the seal system.
Figures 5, 6:
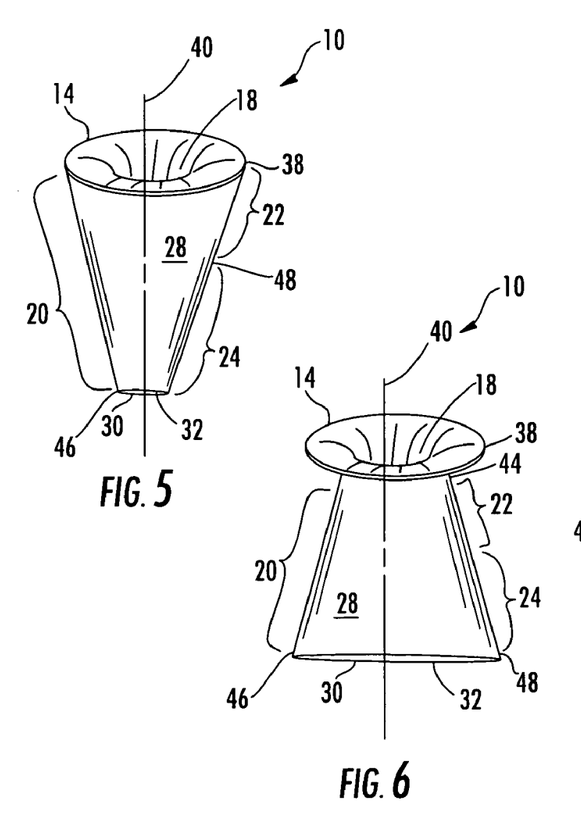
FIG. 5 is a perspective side view of an alternative embodiment of the seal of the seal system.
FIG. 6 is a perspective side view of another alternative embodiment of the seal of the seal system.

The seal system 10 may also include a transition section 22 extending from the flange 14 to the collapsed seal section 24. The transition section 22 may transition the tubular body 20 from the flange 14 to the collapsed seal section 24. The transition section 22 may have numerous configurations. For instance, as shown in FIG. 3, the transition section 22 may extend from the outer edge 38 of the flange 14 toward a centerline 40 of the seal system 10. The flange 14 may include an opening 18 that is smaller than the opening 16 in the fluid component 12 to which the seal system 10 may be attached. In one embodiment, the opening 18 in the flange 14, as shown in FIG. 5, may be less than about one half of the cross-sectional area of the opening 16 in the fluid component 12. The opening 18 in the flange 14 may be sized to receive a straw 26 having a diameter of between about 3/16 of an inch and 1/2 of an inch or other appropriate size. In another embodiment, the opening 18 in the flange 12, as shown in FIG. 4, may be only slightly smaller than the opening 16 in the fluid component 12. In such an embodiment, the opening 18 in the flange 14 may be substantially larger than the straw 26. In one embodiment, the opening 18 in the flange 14, as shown in FIG. 5, may be slightly smaller than the cross-sectional area of the opening 16 in the fluid component 12.

Figure 7:
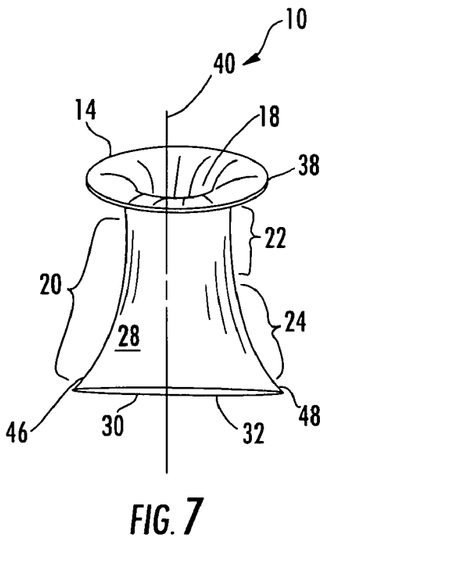
FIG. 7 is a perspective side view of yet another alternative embodiment of the seal of the seal system.

The transition section 22, as shown in FIG. 1, may have a generally conical shape facilitating insertion of the straw 26 into the tubular body 20. In alternative configurations, the transition section 22 may have a generally constant cross-sectional area, as shown in FIG. 4. The transition section 22 may also be generally straight, such as generally parallel and aligned with the centerline 40 of the seal system 10. The transition section 22, as shown in FIG. 5, may have a conical shape with the larger end 42 attached to the flange 14 or, as shown in FIG. 6, may have a conical shape with the smaller end 44 attached to the flange 14. The transition section 22 may be generally straight and include a collapsible seal section 24 that is generally flared open, as shown in FIG. 7.

As shown in FIGS. 1, 3-7, 8, 9 and 11, the collapsed seal section 24 may extend from the transition section 22 away from the flange 14. The collapsed seal section 24 may be configured such that a first side 28 of the collapsed seal section 24 may be in contact with a second side 30 of the collapsed seal section 24 that is opposite to the first side 28 in a relaxed condition. In particular, the first and second sides 28, 30 may contact each other at the first and second edges 46, 48 and between the edges 46, 48. In this position, the first and second sides 28, 30 of the collapsed seal section 24 may be positioned in nearly the same plane. Because of the close proximity of the first and second sides 28, 30, fluids are prevented from flowing through the collapsed seal section 24 toward the transition section 22. Even if the fluid component 12 is inverted, such as a water bottle, the collapsed seal section 24 prevents fluids from passing through the collapsed seal section 24 and into the transition section 22. For example, when a water bottle 12 is turned over and shaken, water does not leak from the seal 10, even after a straw 26 has been inserted through the transition and collapsed sections 22, 24 and withdrawn prior to inverting the water bottle 12. Upon withdrawing the straw 26, the first and second sides 28, 30 collapse onto each other and prevent fluids from flowing through the collapsed seal section 24 to the transition section 22.

In at least one embodiment, the collapsed seal section 24 may be formed from a flexible sheet material, such as, but not limited to, plastic and other appropriate materials. The plastic material may have a thickness of between, but not limited to, about 0.005 inches and about 0.035 inches. The first and second sides 28, 30 may be joined together at first and second edges 46, 48, respectively. The edges 46, 48 may be generally aligned with the centerline 40. The edges 46, 48 may be formed from a weld, such as formed by melting the plastic material together, molded during the formation process, folded, or other appropriate methods. The material may be flexible to such an extent that the transition and collapsible sections 22, 24 may flex and move within the fluid component 12 as the fluid component 12 is inverted. The collapsed seal section 24 may be welded directly to a removable cap 53 or may be formed with the removable cap 53 during the manufacturing process.

Figure 8:
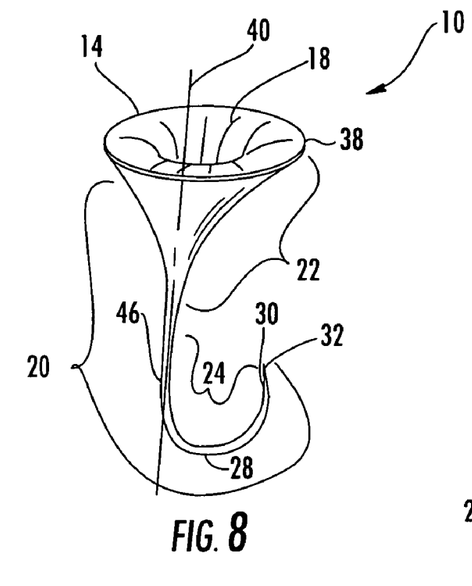
FIG. 8 is a perspective side view of a seal of the seal system with a curved collapsible seal section.
Figure 9:
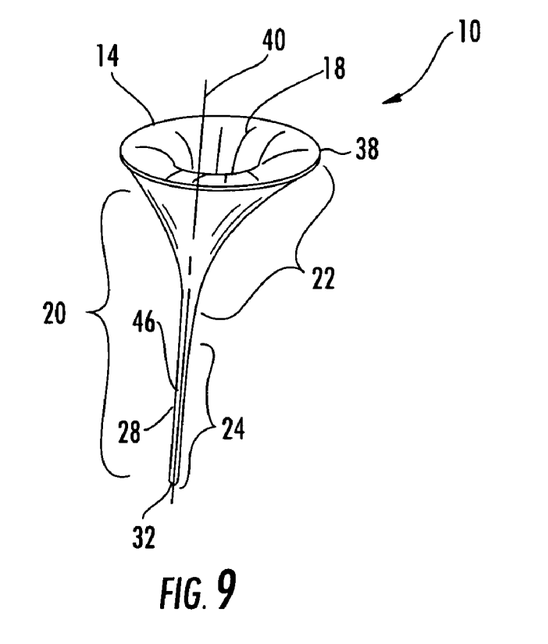
FIG. 9 is a perspective side view of a seal of the seal system with a straight collapsible seal section.
Figure 10:
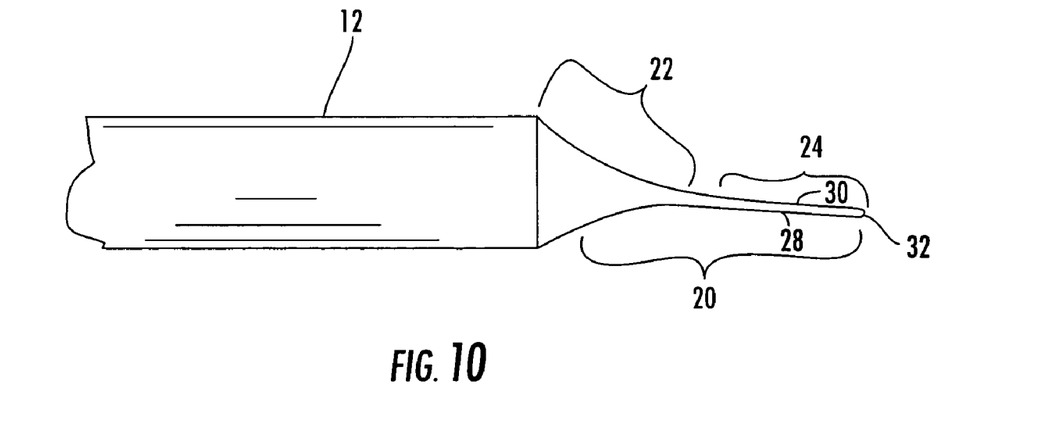
FIG. 10 is a side view of a seal of the seal system attached to a fluid component, a pipe.
Figure 11:
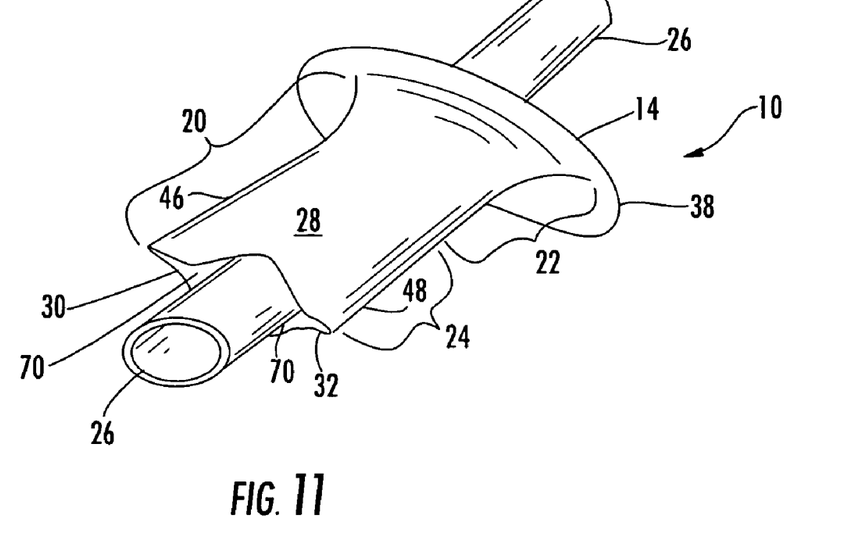
FIG. 11 is a perspective view of a seal of the seal system with a straw inserted through the seal.

The collapsed seal section 24 may be straight, as shown in FIGS. 1 and 9. In another embodiment, the collapsed seal section 24 may have an increasing cross-sectional area, as shown in FIG. 7. In yet another embodiment, as shown in FIG. 8, the collapsed seal section 24 may be generally curved along its length. Each of these embodiments prevents fluids from flowing through the collapsed seal section 24 and into the transition section 22.

Figure 15:
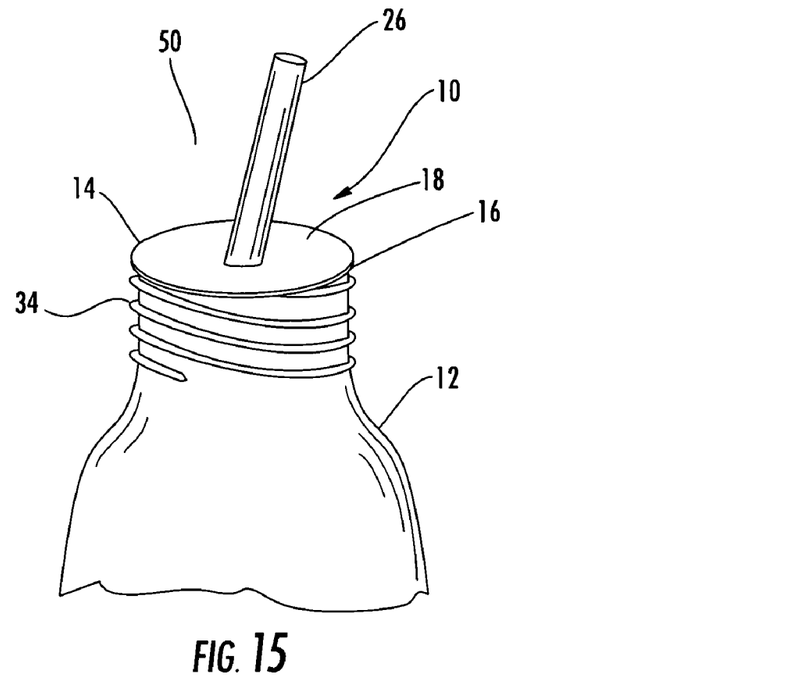
FIG. 15 is a perspective view of a seal positioned within a fluid component, which may be a beverage bottle, including a removable lid that is punctured.

The seal system 10 may also include a removable lid 50 attached to the flange 14. The removable lid 50 may be used to provide a tamperproof seal for beverages and other such items. In one embodiment, the removable lid 50 may be removed to provide access to the tubular body 20. Alternatively, the removable lid 50 may be punctured to provide access to the tubular body 20, as shown in FIG. 15. The removable lid 50 may be formed from any appropriate material, such as, but not limited to, plastics, metallic foils, and other materials. The removable lid 50 may be attached to the flange 14 with an adhesive or other method or material. The removable lid 50 may be formed from the same materials as the tubular body 20 or may be formed from other appropriate materials. The removable lid 50 provides an additional seal layer in addition to the collapsible seal section 24.

Figure 12:
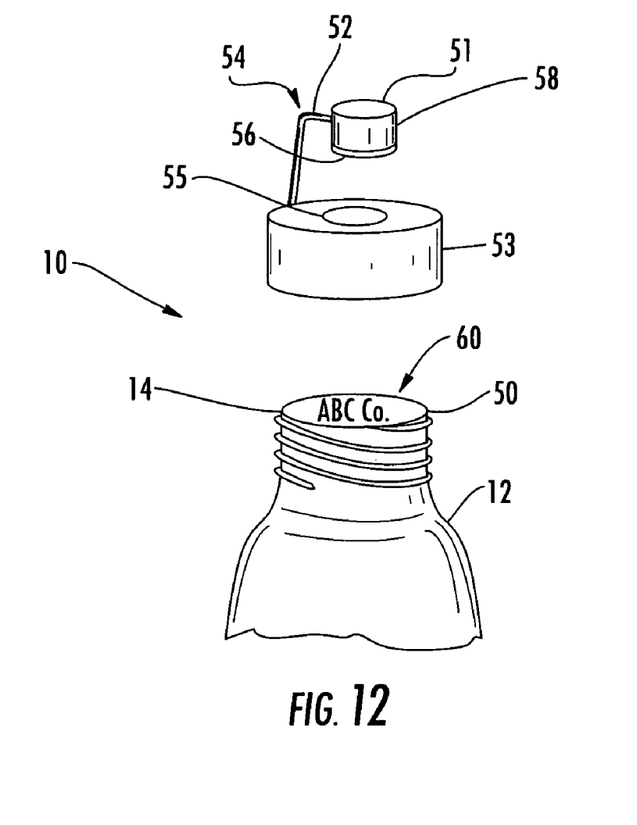
FIG. 12 is an exploded perspective view of a bottle with a plug movably attached to a removable cap and a removable lid attached to the flange of a seal of the seal system.

In other embodiments, as shown in FIG. 12, the seal system 10 may include a plug 51 movably secured to a removable cap 53 with a movable arm 52 such that the plug 51 may be removed from the removable cap 53 to permit fluids to pass therethrough, yet the plug 51 remains attached to the removable cap 53. The plug 51 may be inserted back into an opening 55 of the cap 53 to seal the opening 55 to provide additional sealing protection. The plug 51 may include a retention system 54 for retaining the plug 51 in the opening 55. The retention system 54 may be any system configured to enable the plug 51 to be releasably attached to the cap 53 in the opening 55. In at least one embodiment, the retention system 54 may be a protrusion 56 extending from an outer surface 58 of the plug 51. The protrusion 56 may create an interference fit with the cap 53 to prevent the plug 51 from inadvertently falling out of position within the opening 55 in the cap 53. The plug 51 can provide a second or third sealing layer. In particular, the plug 51 may be in addition to the collapsible seal section 24 or the collapsible seal section 24 and the removable lid 50.

The seal system 10 may also include advertising 60, as shown in FIG. 12. The advertising 60 may include brand names, slogans, promotions or other information. The advertising 60 may correspond with the product to which the seal system 10 is attached or to another product. The advertising 60 may be included on the removable lid 50. The advertising 60 may be configured in a circular pattern around a precut hole or may extend across an entire top including the removable cap 53.

Figure 2:
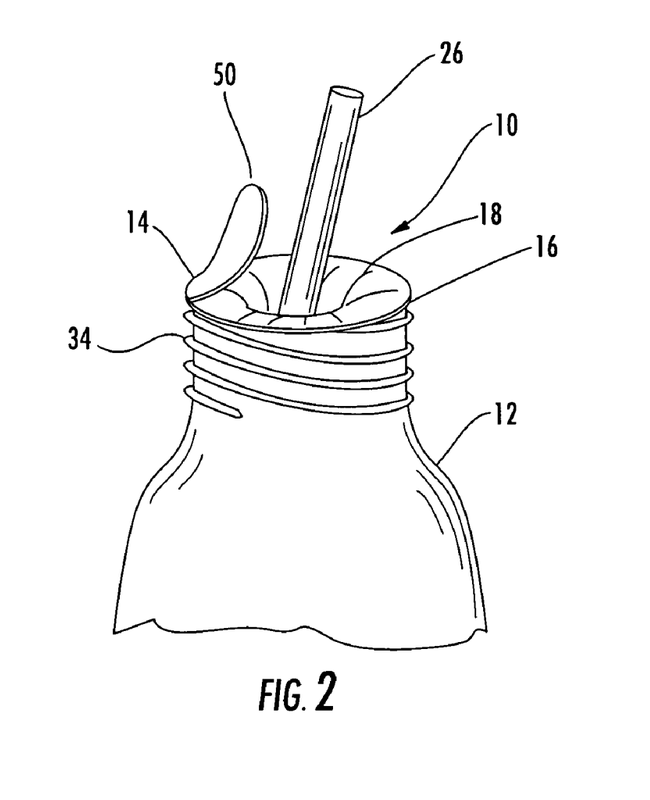
FIG. 2 is a perspective view of a seal positioned within a fluid component, which may be a beverage bottle.

The seal system 10 may be used in many different applications. For instance, the seal system 10 may be attached to a conventional water bottle 12, as shown in FIGS. 2, 3, 12. The flange 14 may be attached to the opening 16 such that the tubular body 20 resides in the water bottle 12. The tubular body 20 may be positioned in the water bottle 12 by a user, or may be positioned in the water bottle 12 during the bottling process or manufacturing process of the bottle. In particular, a user may insert the tubular body 20 into the water bottle 12 and attach the flange 14 to the water bottle 12 with an adhesive.

Figure 13:
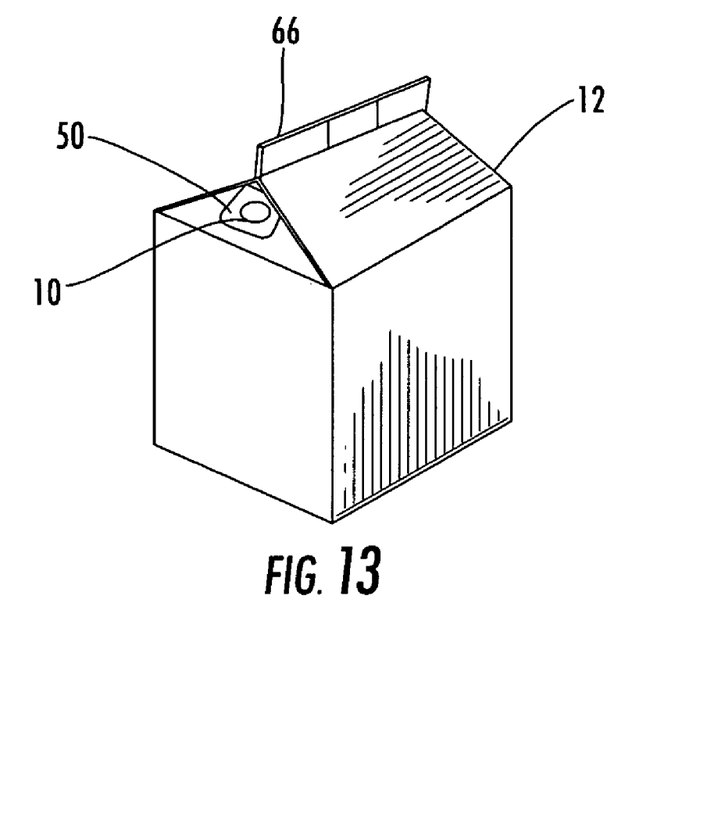
FIG. 13 is a perspective view of a fluid component, a carton, with a seal of the seal system contained within the carton.
Figure 14:
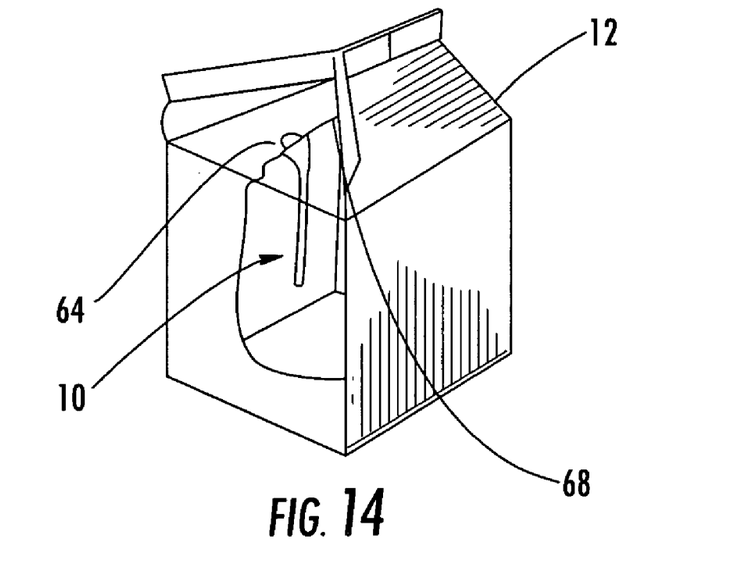
FIG. 14 is a perspective view of the carton with a partial cutaway to show the seal of the seal system in the carton.

In another embodiment, as shown in FIG. 13, the tubular body 20 may be attached to a paper carton 12. As shown in FIG. 14, the flange 14 may be attached to an inner surface 68 of the paper carton 12. A hole 64 may be positioned in the carton 12 under the closed top or in another appropriate location. The hole 64 may be accessed by separating one sealed fold 66 of the carton 12 or by not separating the sealed fold 66. A removable lid 50 may releasably cover the hole 64 for safety. The removable lid 50 may be a thin plastic film, foil, or other appropriate material.

Figure 16:
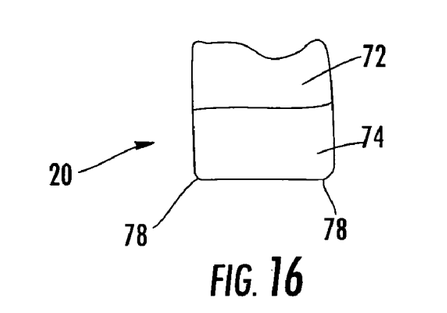
FIG. 16 is a partial view of the collapsed seal section of the seal system with a first side shorter than the second side.
Figure 17:
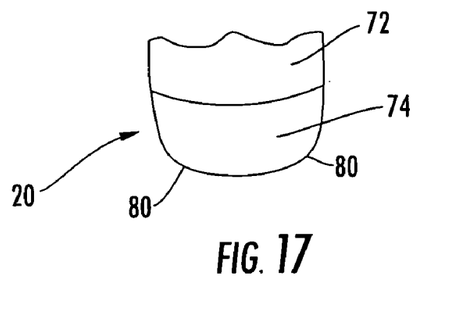
FIG. 17 is a partial view of the collapsed seal section of the seal system with a first side shorter than the second side, wherein an end of the first side is curved downward.
Figure 18:
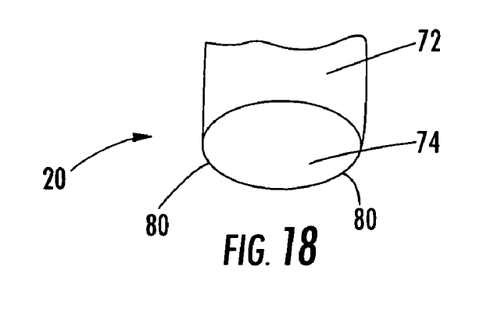
FIG. 18 is a partial view of the collapsed seal section of the seal system with a first side shorter than the second side, wherein an end of the first side is curved upward.
Figure 19:
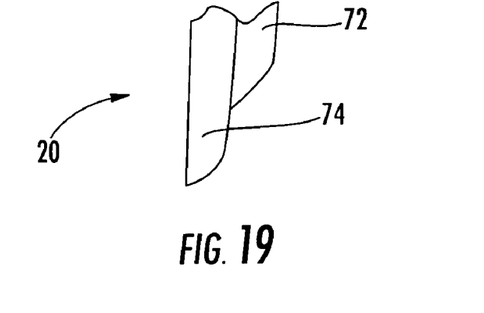
FIG. 19 is a partial side view of the collapsed seal section of the seal system with a first side shorter than the second side.

The seal system 10 may be formed from a tubular body in which a first side 72 is shorter than a second side 74, as shown in FIGS. 16-19. A bottom edge 76 may have square corners 78, as shown in FIG. 16, or may have rounded corners 80, as shown in FIGS. 17 and 18. The first side 72 may be curved downward, as shown in FIG. 17, or upward, as shown in FIG. 18. Such a configuration facilitates sealing the first and second sides 72, 74 together.

Figure 20:
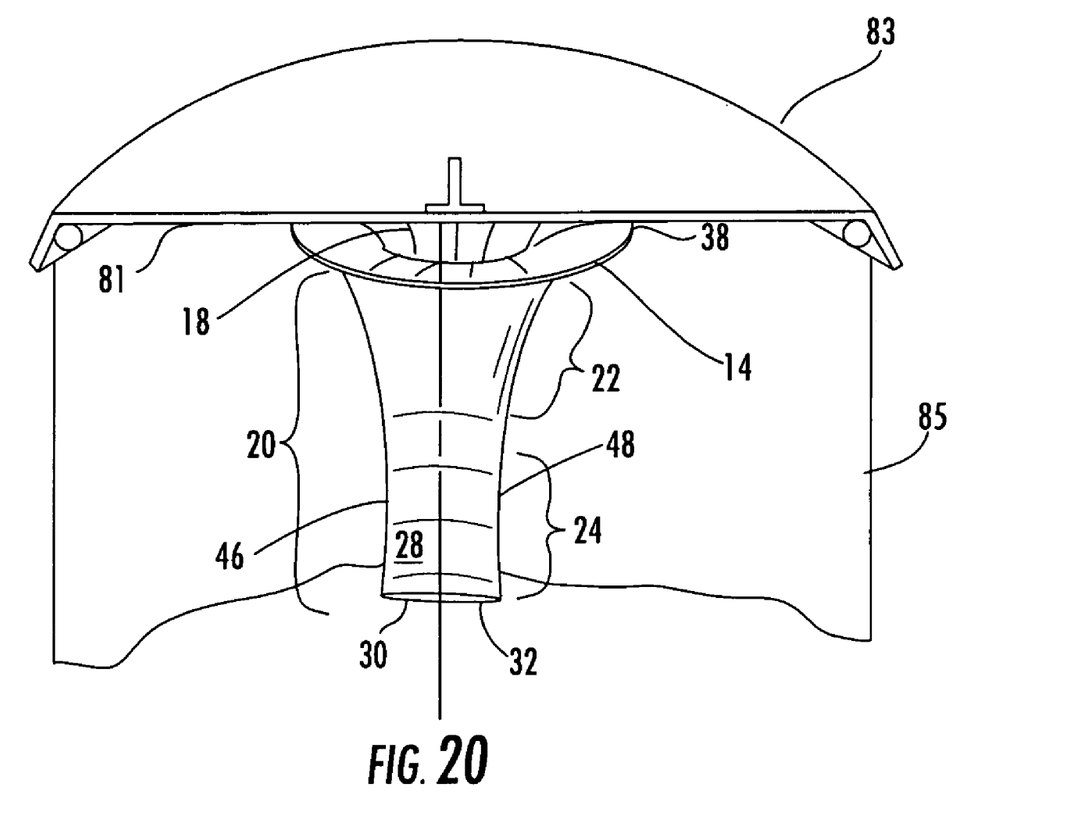
FIG. 20 is a perspective view of a seal having aspects of the seal system and attached to an underside of a plastic lid on a beverage cup.

As shown in FIG. 20, the flange 14 may be attached to an underside 81 of a lid 83. The lid 83 may be configured to be attached to a beverage cup 85. The flange 14 may be sealed to the underside 81 in any appropriate manner. In another embodiment, the flange 14 may be integrally formed with the lid 83 during the manufacturing process. The lid 83 may have any appropriate configuration and may be sized to fit different sized beverage cups 85.

In at least one example, the seal system 10 may be used to provide a seal for a fluid container 12, such as a handheld beverage bottle. The flange 14 may be attached to an opening 16 in the fluid component 12. The transition section 22 and the collapsible seal section 24 may extend into the fluid container 12. A tube 26, such as a straw, may be inserted into the opening 18 in the flange 14 and into the fluid contained in the fluid container 12. The straw 26 may be inserted into the flange 14, through the transition section 22 and into the collapsed seal section 24. As the straw 26 passes into the collapsed seal section 24, the first and second sides 28, 30 of the collapsed seal section 24 separate enough to allow the straw 26 to be inserted through the collapsed seal section. A small gap 70 is created between the first and second sides 28, 30 of the collapsible seal section 24 and the straw 26. Fluids may be withdrawn through the straw 26 by a person sucking on the straw 26, with a mechanical pump, or otherwise. Air may pass through the small gap 70 created between the first and second sides 28, 30 of the collapsible seal section 24 and the straw 26 to prevent formation of a vacuum in the fluid container 12. Thus, fluids may be easily withdrawn from the fluid component 12 through the straw 26 without the hindrance of a vacuum reducing the flow.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A one way seal, comprising:
   a flange having an opening and adapted to be attached to an opening of a fluid component;
   a tubular body extending from the flange, wherein the tubular body is comprised of a transition section attached to the flange and extending generally away from the flange and a collapsed seal section attached to the transition section and extending from the transition section away from the flange;
   the collapsed seal section is configured such that an inner surface of a first side of the collapsed seal section is in contact with an inner surface of a second side of the collapsed seal section that is opposite to the first side in a relaxed condition;
   wherein the first and second sides are attached to each other at first and second axially extending side edges that are generally opposite to each other and wherein the first and second axially extending side edges are positioned between first and second sides; and
   wherein the tubular body is formed from a flexible, sheet material and is adapted to extend and be positioned within the fluid component.

2. The one way seal of claim 1, wherein the first and second side edges are formed from welds.

3. The one way seal of claim 1, wherein the collapsed seal section is formed from plastic.

4. The one way seal of claim 3, wherein the plastic has a thickness of between about 0.005 inches and about 0.035 inches.

5. The one way seal of claim 1, further comprising a removable lid attached to the flange and configured to seal the opening in the flange by extending across the opening in the flange.

6. The one way seal of claim 5, wherein the removable lid is formed from a flexible material.

7. The one way seal of claim 5, further comprising a removable cap with a movable plug, wherein the plug is movably secured to the cap with a movable arm such that the plug may be removed from the opening in the cap to permit fluids to pass therethrough yet remain attached to the cap with the movable arm.

8. The one way seal of claim 1, wherein the collapsed seal section is generally straight.

9. The one way scat of claim 1, wherein the collapsed seal section is generally curved along a length of the collapsed seal section.

10. The one way seal of claim 1, wherein the collapsed seal section is generally curved along a longitudinal axis of the collapsed seal section.

11. The one way seal of claim 1, wherein the tubular body may further comprise commercial advertising.

12. The one way seal of claim 1, further comprising a tube inserted through the opening in the flange, through the transition section, and through the collapsed seal section.

13. The container with a one way seal of claim 12, wherein the first and second edges are formed from welds.

14. The container with a one way seal of claim 12, further comprising a removable lid attached to the flange and configured to seal the opening in the flange by extending across the opening in the flange.

15. The container with a one way seal of claim 14, wherein the removable lid is formed from a flexible material.

16. The container with a one way seal of claim 14, further comprising a removable cap with a movable plug, wherein the plug is movably secured to the cap with a movable arm such that the plug may be removed from the opening in the cap to permit fluids to pass therethrough yet remain attached to the cap with the movable arm.

17. The one way seal of claim 1, wherein the first side is shorter than the second side.

18. A container with a one way seal, comprising:
   the container having an opening;
   a flange attached to the opening of the container, wherein the flange includes an opening;
   a tubular body extending from the flange into the container, wherein the tubular body is comprised of a transition section attached to the flange and extending generally away from the flange and a collapsed seal section attached to the transition section and extending from the transition section away from the flange;
   the collapsed seal section is configured such that an inner surface of a first side of the collapsed seal section is in contact with an inner surface of a second side of the collapsed seal section that is opposite to the first side in a relaxed condition;

wherein the first and second sides are attached to each other at first and second axially extending side edges that are generally opposite to each other and wherein the first and second axially extending side edges are positioned between first and second sides; and wherein the tubular body is formed from a flexible, sheet material.

19. The container with a one way seal of claim 18, wherein the collapsed seal section is formed from plastic.

20. The container with a one way seal of claim 19, wherein the plastic has a thickness of between about 0.005 inches and about 0.035 inches.

21. The container with a one way seal of claim 18, wherein the collapsed seal section is generally straight.

22. The one way seal of claim 18, wherein the collapsed seal section is generally curved.

23. The one way seal of claim 18, wherein the tubular body may further comprise commercial advertising.

24. The one way seal of claim 18, further comprising a tube inserted through the opening in the flange, through the transition section, and through the collapsed seal section.

25. The one way seal of claim 18, wherein the first side is shorter than the second side.

26. The one way seal of claim 18, wherein the second side has rounded corners.

* * * * *